United States Patent [19]

Nakamura et al.

[11] 4,207,459
[45] Jun. 10, 1980

[54] OPTICAL COMMUNICATION SYSTEM UTILIZING LIGHT EMITTING DIODE

[75] Inventors: Hiroshi Nakamura, Sagamihara; Naomasa Hanano, Kawasaki; Kazuo Iguchi, Chaigasaki, all of Japan

[73] Assignee: Fujitsu Limited, Japan

[21] Appl. No.: 831,851

[22] Filed: Sep. 9, 1977

[30] Foreign Application Priority Data

Sep. 13, 1976 [JP] Japan .................. 51/109702

[51] Int. Cl.² ........................................ H04B 9/00
[52] U.S. Cl. ........................................ 455/613
[58] Field of Search ..................... 250/199; 358/280

[56] References Cited

U.S. PATENT DOCUMENTS

| 3,814,929 | 6/1974 | Whitfield | 250/199 |
| 3,845,242 | 10/1974 | Richeson | 358/280 |
| 3,927,316 | 12/1975 | Citta | 250/199 |
| 3,984,824 | 10/1976 | Blackburn | 250/199 |

*Primary Examiner*—Howard W. Britton
*Attorney, Agent, or Firm*—Staas & Halsey

[57] ABSTRACT

In an optical communication system, wherein light intensity modulation with no carrier is performed using a light emitting diode with linear relation of the drive signal current vs. optical output power over a range which changes with frequency of the drive signal, the input signal is modulated for relatively larger amplification of frequencies higher than a predetermined frequency, above the thermal response frequency of the light emitting diode, than for frequencies lower than the predetermined frequency.

24 Claims, 7 Drawing Figures

OPTICAL COMMUNICTION SYSTEM UTILIZING LIGHT EMITTING DIODE

BACKGROUND OF THE INVENTION

1. Field of the Invention

This invention relates to an optical communication system, particularly to an improvement of modulation in optical communication systems utilizing a light emitting diode with linear relation of drive signal current vs. optical output power over a range that changes with signal frequency.

2. Description of the Prior Art

It is known that the relation between drive signal current and optical output power of a light emitting diode has a linear range that depends on signal frequency. When modulating light intensity in an optical communication system utilizing a light emitting diode, this non-linear characteristic does not cause any problems for digital signals, but has the disadvantage for analog signals that the output signal waveform is distorted to generally preclude a more desirable degree of modulation without such distortion.

SUMMARY OF THE INVENTION

A purpose of this invention is to modulate the light intensity of a light emitting diode in an optical communication system, using a light emitting diode with the above characteristic, to allow a large degree of modulation and less distortion of output signal.

Another object of this invention is to provide a simple circuit for modulating the light intensity of a light emitting diode in an optical communication system.

The optical communication system of this invention is characterized by an emphasis circuit which modulates the signal to relatively amplify frequencies above a predetermined frequency, which exceeds the thermal response frequency of the light emitting diode, more than frequencies below this predetermined frequency. With the above and other objects in view that will hereinafter appear, the nature of the invention will be more closely understood by reference to the following description, the appended claimed subject matter, and the accompanying drawings.

DESCRIPTION OF THE PREFERRED EMBODIMENT

Figure 1:
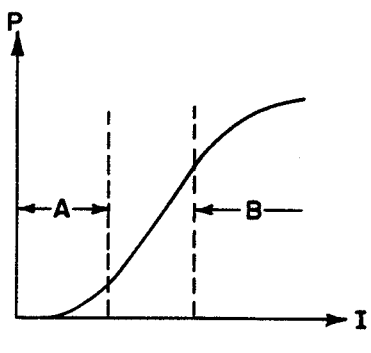
FIG. 1 shows the relation between drive signal current and optical output power of a light emitting diode.

FIG. 1 shows the relation between drive signal current and optical output power of a light emitting diode.

As indicated in the figure, the optical output power P of the light emitting diode increases non-linearly with increase of the drive signal current I.

The non-linear region A is typical of the voltage vs. current relation of light emitting diodes, and the non-linear region B represents deterioration of light emission efficiency due to temperature rise in the junction area as a result of the drive signal current.

This invention relates to the non-linear characteristic of region B. The operating range between regions A and B has an almost linear characteristic. In order to produce an optical output signal with less distortion for analog light intensity modulation, it is necessary to set the fixed bias to almost the center of this linear area and to perform the amplitude modulation within this area. Therefore, the degree of modulation cannot be made large because the linear portion of the operating curve is limited for the higher frequencies above the thermal response frequency.

Figure 2:
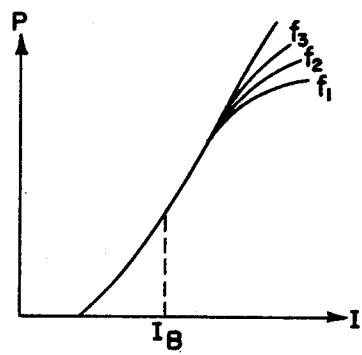
FIG. 2 shows the influence of the drive signal frequency of a light emitting diode on the relation between drive signal current and optical output power.

FIG. 2 shows the influence of the drive signal frequency for the light emitting diode on the relation between drive signal current and optical output power.

As shown in this figure, when amplitude modulation is carried out by superimposing an AC signal on the fixed bias current $I_B$ being applied to the light emitting diode, the range of the linear relation between drive signal current and optical output power changes with AC signal frequency $f_m$. The upper limit of the linear range in region B of FIG. 1 increases with increase of drive signal frequency $f_m$; namely, as the drive signal frequency increases through $f_1$, $f_2$, $f_3$,......, the upper limit of the linear range expands out to greater values of drive signal current as the applied drive signal frequency increases above the thermal response frequency.

This phenomenon is caused by the thermal response of the light emitting diode. Namely, in the case of the light emitting diode, modulation is performed centered on the bias current $I_B$ and therefore the average power consumption of a light emitting diode is independent of the frequency. However, since a light emitting diode has a thermal response time constant $\tau$ for frequency near the thermal response frequency $f_T$ corresponding to this thermal response time constant $\tau$ (here, $f_\tau = 1/(2\pi\tau)$) or higher than it, the temperature rise at the junction area of a light emitting diode is small and little deterioration occurs in the light emission efficiency, thus extending the linear range into the region B in FIG. 1.

On the other hand, for frequency near the thermal response frequency, temperature rise at the junction area of the light emitting diode becomes significant as the frequency approches and drops below the thermal response frequency, and the non-linear characteristic of region B in FIG. 1 indicates deterioration of the light emission efficiency.

Finally, when the AC signal frequency $f_m$ satisfies the following equation (1), the region B in FIG. 1 shows almost linear characteristic.

$$f_m >> f_\tau = 1/(2\pi\tau)$$

(1)

This invention utilizes this characteristic, namely, modulation with relatively large amplification within the linear operating range for input signal frequency $f_m$ satisfying equation (1), and with relatively low amplification of frequencies in the range of modulation frequency $f_m$ near to or lower than the thermal response frequency $f_\tau$. Thereby frequency dependent amplitude modulation is performed to be compatible with the range of excellent linearity. Thus, for the transmitted optical output signal as a whole, the degree of modulation can be made large with less distortion. For reception and reconstruction of the original signal, a demodulation system must be used.

Figure 3:
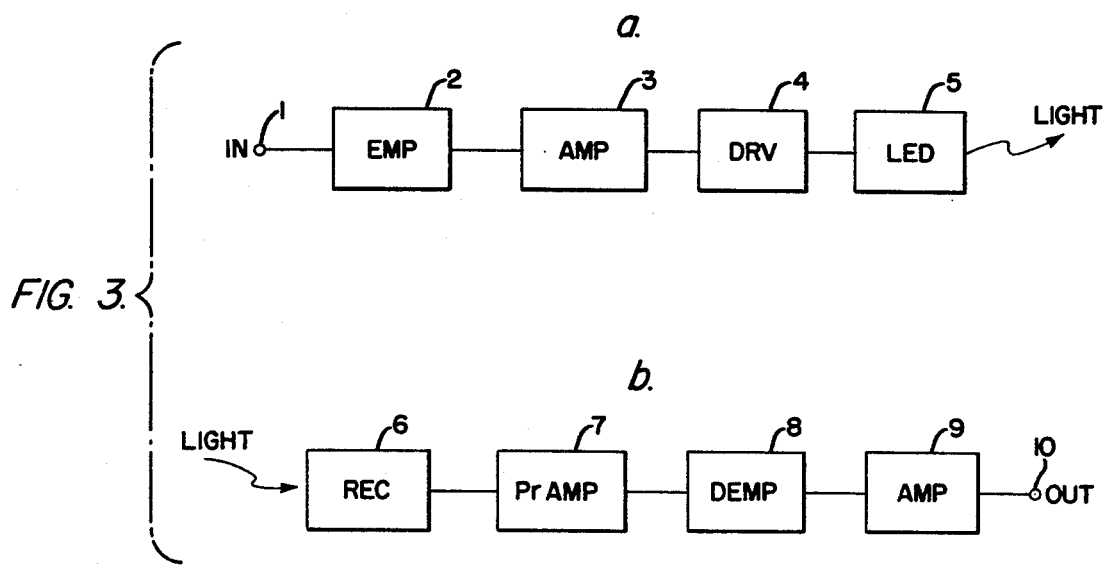
FIG. 3 shows a block diagram indicating an embodiment of the modulation and demodulation systems of this invention.

FIGS. 3 (a) and (b) show block diagrams of configurations of the modulation and demodulation systems of this invention respectively.

The modulation system will be described first.

When an input signal is applied to the input terminal 1, the emphasis circuit 2 relatively emphasizes the high frequency components of the input signal. For frequency of the input signal greater than a predetermined frequency, the relative amplification is greater than for input signal frequency less than the predetermined frequency value. The emphasized signal is then applied to the amplifier 3 and the thusly modulated signal is applied to the light emitting diode driving circuit 4 and to drive the light emitting diode 5.

Thereby, the light emitting diode 5 emits an output light signal having intensity corresponding to the amplitude of the driving signal, which is the modulated input signal.

Next the demodulation system will be explained.

As explained above, when the light emitting diode emits light with intensity at each frequency corresponding to the amplitude of the current of the drive signal frequency, the light receiving element 6 receives this light. The small output of the light receiving element 6 is pre-amplified by the pre-amplifier circuit 7 and the amplified signal is then applied to the de-emphasis circuit 8 which has a characteristic opposite from the abovementioned emphasis circuit. Thus for output signal frequency of the pre-amplifier circuit 7 greater than the predetermined frequency, the relative amplification is smaller than when the frequency is less than the predetermined value. Thereby, the emphasized signal is de-emphasized and then it is amplified again by the amplifier circuit 9. Thus, a signal corresponding to the input signal at the input terminal 1 of the modulation system results at the output terminal 10.

Figure 4:
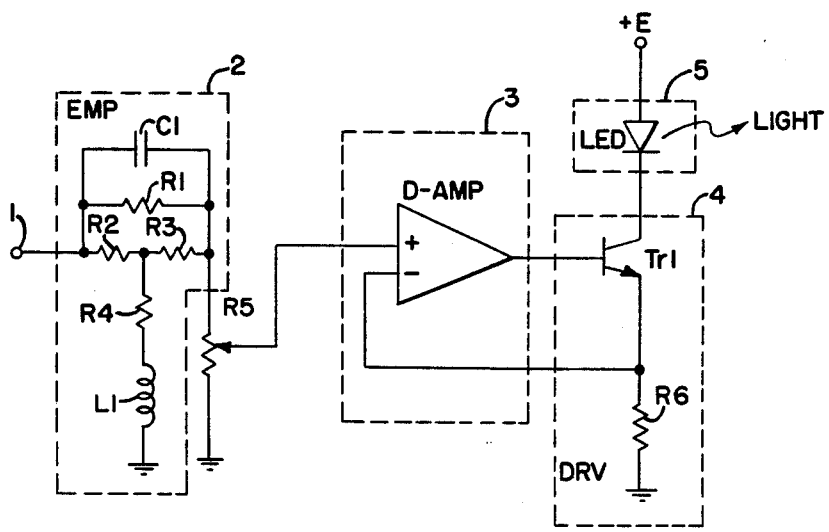
FIG. 4 shows a circuit diagram of an embodiment of the modulation system of this invention.

FIG. 4 shows a more specific preferred embodiment of circuit configuration of the modulation system of this invention. In this figure, 1 represents the input terminal, 2 the emphasis circuit, 3 the amplifier circuit, 4 the driving circuit, and 5 the light emitting diode as indicated in FIG. 3.

The input terminal 1 is connected to the emphasis circuit 2. The circuit configuration of emphasis circuit 2 is as follows; namely, the resistor $R_1$ and capacitor $C_1$ are respectively connected in parallel to the resistors $R_2$ and $R_3$ having equal resistance values, and in addition, resistor $R_4$ and inductance element $L_1$ are connected in series between the connecting point of resistors $R_2$ and $R_3$ and ground.

In this circuit configuration, the value of each element is selected so that capacitor $C_1$ offers low impedance and inductance element $L_1$ offers high impedance for input signal frequency greater than the predetermined frequency. Thereby, for drive signal frequency greater than the predetermined frequency the output is amplified to a high level. On the other hand, for drive signal frequency lower than the predetermined frequency, the capacitor $C_1$ becomes a high impedance and the inductance element becomes a low impedance and a low level output results.

Therefore, this emphasis circuit has the modulation characteristic that relative amplification is larger for drive signal frequency greater than the predetermined frequency than for when the frequency is less than the predetermined frequency. This characteristic will be explained in more detail referring to FIG. 6.

Figure 6:
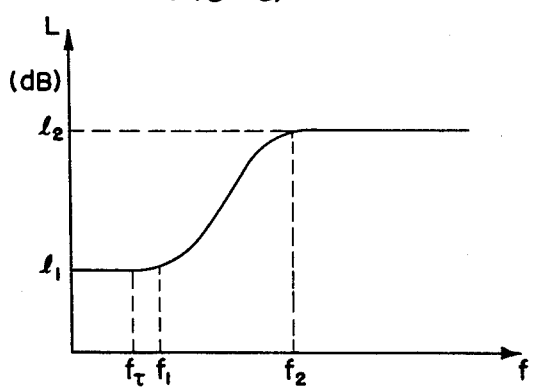
FIG. 6 shows the relation between drive signal frequency and output level of the emphasis circuit of this invention.

FIG. 6 shows an example of the frequency-dependent modulation characteristic of the emphasis circuit output to the light emitting diode. The f-axis indicates frequency of the drive signal, while the L-axis indicates the output level (in dB) of the emphasis circuit.

In the low frequency area of this figure, namely, at the frequency $f_1$, for example 30 kHz which is slightly greater than the thermal response frequency $f_\tau$ of the light emitting diode which is typically in the range of 20 to 25 kHz, a certain loss is given to the drive signal by the emphasis circuit 2 to obtain a low level output $l_1$. In the area between frequency $f_1$ and the frequency $f_2$ which is sufficiently greater than the thermal response frequency $f_\tau$ for example, at 100 kHz, the loss given to the drive signal by the emphasis circuit 2 is gradually decreased. For frequency greater than $f_2$, no loss is given, and thereby a high level output $l_2$ can be obtained. This frequency characteristic is shown in FIG. 6.

The emphasis circuit having such a modulation characteristic is connected to the amplifier circuit 3 via the resistor $R_5$ shown in FIG. 4.

Specifically, the amplifier circuit 3 may be a differential amplifier.

The resistance value of the resistor $R_5$ can be changed and it is provided in order to adjust the impedance matching between the emphasis circuit and amplifier circuit.

The amplifier circuit 3 is connected to the driving circuit 4 of a light emitting diode. The driving circuit 4 has a configuration such that the emitter of transistor Tr 1 is grounded via the resistor $R_6$ and said amplifier circuit 3 is connected to the base of transistor Tr 1.

The transistor Tr 1 forms a class A amplifier and a current corresponding to the signal applied to the base of transistor Tr 1 flows between the collector and emitter of transistor Tr 1.

Moreover, a negative feedback loop is formed by connecting the emitter of transistor Tr 1 and the negative terminal of the amplifier 3, in order to compensate for non-linearity of the driving circuit.

A light emitting diode 5 is connected to the driving circuit 4, and specifically between the collector of transistor Tr 1 and the power source $+E$.

Therefore, the bias current $I_B$ of the light emitting diode is determined mainly by the resistor $R_6$.

Figure 5:
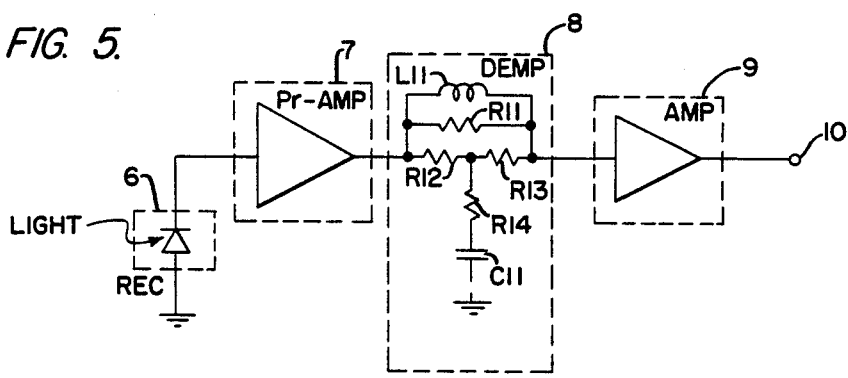
FIG. 5 shows a circuit diagram of an embodiment of the demodulation system of this invention.

FIG. 5 shows a specific preferred embodiment of circuit configuration of the demodulation system.

In this figure, 6 represents the light receiving element, 7 the preamplifier circuit, 8 the de-emphasis circuit, 9 the amplifier circuit, and 10 the output terminal. These are already indicated in FIG. 3.

Practically, the light receiving element 6 comprises a PIN diode, avalanche photo-diode APD, or other element and it is connected to the pre-amplifier circuit 7. Moreover, this pre-amplifier circuit 7 is connected to the de-emphasis circuit 8.

In the de-emphasis circuit 8 the resistor $R_{11}$ and inductance element $L_{11}$ are each connected in parallel respectively to the series resistors $R_{12}$ and $R_{13}$ having equal resistance values. Simultaneously, the resistor $R_{14}$ and capacitor $C_{11}$ are connected in series between the connecting point of resistors $R_{12}$ and $R_{13}$ and ground.

In this circuit configuration, when the value of each element is determined to satisfy desired conditions, if the output signal frequency of the pre-amplifier 7 is greater than the predetermined frequency, the inductance element $L_{11}$ becomes high impedance while the capacitor $C_{11}$ becomes low impedance. Thereby, the output current of pre-amplifier circuit 7 flows mainly to ground via the capacitor $C_{11}$. In this case, the output signal of the pre-amplifier circuit 7 is applied to the amplifier circuit 9 at a low level. On the other hand, when the output signal frequency of preamplifier circuit 7 is less than the predetermined frequency, the inductance element $L_{11}$ becomes low impedance, while the capacitor $C_{11}$ becomes high impedance. Therefore, the output current of pre-amplifier circuit 7 flows mainly through the inductance element $L_{11}$. Thus the output signal of the preamplifier circuit 7 is applied to the amplifier circuit 9 at a high level.

For this reason, when the output signal of the preamplifier circuit 7 is greater than the predetermined frequency, this de-emphasis circuit has amplification factor lower than when such frequency is less than the predetermined frequency.

This characteristic will be explained in more detail by referring to FIG. 7.

Figure 7:
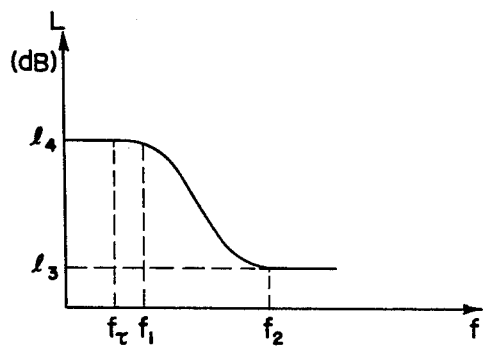
FIG. 7 shows the relation between drive signal frequency and output level of the de-emphasis circuit of this invention.

FIG. 7 shows an example of the frequency-dependent modulation characteristic of this de-emphasis circuit. The f-axis indicates the signal frequency, while the L-axis shows the output level (in dB) of the de-emphasis circuit.

The frequency characteristic shown in this figure is that in the low frequency area, namely, at the frequency $f_1$, for example 30 kHz which is slightly greater than the thermal response frequency $f_r$ of the light emitting diode typically in the range 20 to 25 kHz, a high level output $l_4$ can be obtained. Further, in the range between the frequency $f_1$ and frequency $f_2$, which values are sufficiently greater than the thermal response frequency $f_r$, for example for 100 kHz, the level is gradually decreased. For frequency greater than the frequency $f_2$, a low level signal $l_3$ is output.

A de-emphasis circuit 8 having such a frequency-dependent modulation characteristic is connected to the output terminal 10 via the amplifier circuit 9 as shown in FIG. 5.

According to the circuit mentioned above, the non-linearity of region B in FIG. 1 is improved and the linear area is effectively expanded. Therefore, as compared with the system not depending on this invention, the bias current can be set large and the degree of modulation for the signal as a whole can also be made larger.

For example, when modulating with low distortion factor without emphasis, the modulation degree was at most 40% when the bias current was selected to about 80 mA. But, in the modulation system with emphasis in accordance with this invention, the bias current can be raised up to about 100 mA and the degree of modulation can be raised up to about 80% with the same distortion factor.

Here, it is obvious that the non-linear characteristic due to the thermal response of light emitting diode gives no problem when employing a modulation method utilizing a carrier. Namely, there is no problem in the non-linearity characteristic so long as the carrier has a very much greater frequency than the thermal response frequency and the light emitting diode is driven by such modulated signal. However, for example, in the case of amplitude-modulating (AM) a carrier, the available frequency may be only as high as 30 MHz due to frequency characteristics of a light emitting diode. Therefore, the available modulation frequency may be only as high as about 15 MHz, and such a comparative signal frequency band is not sufficiently wide. On the other hand, when single sideband or vestigial sideband modulation is employed, the available bandwidth can be widened but the system itself becomes complicated and uneconomical. The optical communication system without a carrier as disclosed by this invention ensures a simple configuration and allows the available bandwidth of the light emitting diode to be used directly as the baseband signal bandwidth.

Therefore, a distinct advantage of this invention is that one source of non-linearity in a light emitting diode is avoided while increasing the degree of modulation of the transmitted optical signal. Other embodiments and variations of this invention will be obvious to skilled workers in this field.

I claim:

1. An optical communication system responsive to an input signal of multiple frequency components for utilizing light intensity modulation without a carrier in driving a light emitting diode, said diode having a thermal response frequency, said system comprising:

emphasis means for amplifying to a relatively greater degree signal frequency components of frequency greater than a predetermined frequency and for amplifying to a relatively lesser degree signal frequency components of frequency less than said predetermined frequency to produce an output signal of said emphasis means, said predetermined frequency being higher than said thermal response frequency;

amplifier means connected to said emphasis means for amplifying said output of said emphasis means to produce an output of said amplifier means;

drive means connected to said amplifier means to produce a drive current; and transmitting means responsive to said drive current for producing said light signal, said light signal having frequency components, each of said light signal frequency components having power that corresponds linearly to the amplitude of the respective frequency component of said drive current.

2. The optical communication system of claim 1, said emphasis means comprising a first resistor, a capacitor and a series circuit of second and third resistors of equal value having a connecting point therebetween, said resistor, capacitor and series circuit being connected in parallel to each other, and a fourth resistor and an inductance connected in series between said connecting point of said second and third resistors and ground.

3. The optical communication system of claim 1, said emphasis means having relative amplification of a first constant value for signal frequency lower than a first constant frequency, said first constant frequency being higher than said thermal response frequency of said light emitting diode, said relative amplification increasing gradually with increase in signal frequency for frequency higher than said first constant frequency and lower than a second constant frequency, and said relative amplification having a second constant value larger than said first constant value for signal frequency greater than said second constant frequency, said predetermined frequency lying between said first and second constant frequencies.

4. The optical communication system of claim 1, wherein a negative feedback loop is formed between said driving means and said amplifier means.

5. An optical communication system responsive to an input signal of multiple frequency components for utilizing on a transmitting side light intensity modulation without a carrier in driving a light emitting diode by means of an emphasized drive signal, said emphasized drive signal having frequency components corresponding to said multiple frequency components, various ones of said input signal frequency components having been linearly amplified by different amounts to form said emphasized frequency components, said diode having a thermal response frequency, the receiving side of said system comprising:

light receiving means for receiving light emitted from said light emitting diode;

preamplifier means connected to said light receiving means to preamplify the output of said light receiving means to produce an output of said preamplifier means;

de-emphasis means connected to said preamplifier means for amplifying to a relatively greater degree signal frequency components of frequency less than a predetermined frequency to produce an output of said de-emphasis means, said predetermined frequency being greater than said thermal response frequency; and amplifier means connected to said de-emphasis means to amplify said output of said de-emphasis means.

6. The optical communication system of claim 5, said de-emphasis means comprising a first resistor, an inductance and a series circuit of second and third resistors of equal value and having a connecting point therebetween, said resistor, inductance and series circuit being connected in parallel to each other, and a fourth resistor and a capacitor connected in series between said connecting point of said second and third resistors and ground.

7. The optical communication system of claim 5, wherein said de-emphasis means has relative amplification of a first constant value of signal frequency less than a first constant frequency, said first constant frequency being larger than said thermal response frequency of the light emitting diode, said relative amplification decreasing gradually with increase of signal frequency above said first constant frequency and below a second constant frequency, and said relative amplification having a second constant value smaller than said first constant value for signal frequency greater than said second predetermined frequency, said predetermined frequency lying between said first and second constant frequencies.

8. An optical communication system responsive to an input signal of multiple frequency components for utilizing light intensity modulation without a carrier in driving a light emitting diode, said diode having a thermal response frequency, said system comprising on a transmitting side:

emphasis means for amplifying to a relatively greater degree signal frequency components of frequency above a predetermined frequency and for amplifying to a relatively lesser degree the signal frequency components of frequency below said predetermined frequency to produce an output signal of said emphasis means, amplifier means connected to said emphasis means for amplifying the output of said emphasis means to produce an output of said amplifier means, driving means connected to said amplifier means for driving said light emitting diode according to said output of said amplifier means, the light output of said light diode not corresponding linearly to said input signal, and said system comprising on a receiving side:

light receiving means for receiving light emitted from said light emitting diode and to produce an output of said light receiving means, preamplifier means connected to said light receiving means for preamplifying said output of said light receiving means and to produce an output of said preamplifier means, de-emphasis means connected to said preamplifier means for amplifying to a relatively lesser degree signal frequency components of frequency greater than a predetermined frequency and for amplifying to a relatively greater degree signal frequency components of frequency less than said predetermined frequency to produce an output of said de-emphasis means, said predetermined frequency being greater than said thermal response frequency and amplifier means connected to said de-emphasis means to amplify said output of said de-emphasis means.

9. The optical communication system of claim 8, said emphasis means comprising a first resistor, a capacitor and a series circuit of second and third resistors having a connecting point therebetween and being of equal resistance values, said resistor, capacitor and series circuit being connected in parallel to each other and a fourth resistor and an inductance connected in series between said connecting point of said second and third resistors and ground.

10. The optical communication system of claim 8, said emphasis means having relative amplification of a first constant value for signal frequency less than a first constant frequency above said thermal response frequency of said light emitting diode said relative amplification increasing with increase in signal frequency above said first constant frequency and lower than a second predetermined frequency, and said relative amplification having a second constant value larger than said first constant value for signal frequency greater than said second constant frequency.

11. The optical communication system of claim 8, wherein a negative feedback loop is formed between said driving means and said amplifier means.

12. The optical communication system of claim 8, wherein said de-emphasis means comprises a first resistor, an inductance and a series circuit of second and third resistors of equal resistance value and having a connecting point therebetween, said resistance, inductance and series circuit being connected in parallel, and a fourth resistor and a capacitor connected in series between said connecting point of said second and third resistors and ground.

13. The optical communication system of claim 8, said de-emphasis means having relative amplification of a first constant value for signal frequency lower than a first constant frequency above said thermal response frequency of said light emitting diode, and said relative amplification decreasing with signal frequency increase for signal frequency greater than said first constant frequency and less than a second constant frequency, and said relative amplification having a second constant value smaller than said first constant value for signal frequency greater than said second constant frequency, said predetermined frequency lying between said first and second constant frequencies.

14. An optical communication system responsive to an input signal having frequency components distributed within a range of frequencies for utilizing light intensity modulation without a carrier, said system comprising:
emphasis means for emphasizing said input signal to generate an emphasis output signal, said emphasizing of said input signal comprising relatively amplifying to a greater extent said frequency components of said input signal having frequency greater than a predetermined frequency within said frequency range, and amplifying to a lesser extent said frequency components of said input signal having frequency less than said predetermined frequency to produce an emphasis output signal, said emphasis output signal having frequency components corresponding linearly and respectively to said frequency components of said input signal;
drive means responsive to said emphasis output signal for producing a drive current, said drive current having frequency components corresponding linearly and respectively to said frequency components of said emphasis output signal; and
transmitting means responsive to said drive current for producing said light signal having frequency components, each of said light signal frequency components having power that corresponds linearly and respectively to said frequency components of said drive current over a range in the amplitude of said drive current frequency components, said range increasing with the frequency of said frequency components of said drive current.

15. The system of claim 14 comprising amplification means connected between said emphasis and said drive means for amplifying said emphasis output signal to generate an amplifier output signal for input into said drive circuit.

16. An optical communication system for receiving and de-emphasizing a transmitted light signal, said light signal being modulated without a carrier, said light signal representing an input signal that was emphasized prior to said transmission, said light signal having frequency components distributed within a range of frequencies, said light signal not corresponding linearly to said input signal, said system comprising:
detector means responsive to said light signal for generating a detector output signal, said detector output signal having frequency components in said frequency range, each of said frequency components of said detector output signal corresponding linearly and respectively to said frequency components of said light signal; and
de-emphasis means for de-emphasizing said detector output signal to produce a de-emphasis output signal having frequency components corresponding respectively to said frequency components of said input signal, said de-emphasizing of said detector output signal comprising relatively amplifying to a greater extent said frequency components of said detector output signal having frequency less than a first predetermined frequency than said frequency components of said input signal having frequency greater than said first predetermined frequency.

17. The system of claim 16 further comprising preamplifier means connected between said detector and said de-emphasis means for preamplifying said detector output signal for input into said de-emphasis means.

18. The system of claim 16 comprising amplifier means for amplifying said output of said de-emphasis means.

19. An optical communication system for utilizing light intensity modulation without a carrier in communicating an input signal having frequency components distributed within a frequency range, said communication system comprising transmission and receiving subsystems, said transmission subsystem comprising:
emphasis means responsive to said input signal to generate an emphasis output signal for relatively amplifying to a greater extent said frequency components of said input signal having frequency greater than a first predetermined frequency within said frequency range and relatively amplifying to a lesser extent said frequency components of said input signal of frequency less than said first predetermined frequency;
drive means responsive to said emphasis output signal for producing a drive current according to said emphasis circuit output signal, said drive current having frequency components in said range, each of said drive current frequency components corresponding linearly and respectively to said frequency components of said emphasis output signal; and p1 transmitting means responsive to said drive current for producing a light signal having frequency components in said range, each of said light signal frequency components having power that corresponds linearly to said drive current over a range in the amplitude of said drive current, said range increasing with the frequency of said frequency components of said drive current and said light signal not corresponding linearly to said input signal; and
said receiving subsystem comprising:
detector circuit means responsive to said light signal for generating a detector output signal, said detector output signal having frequency components in said frequency range, each of said frequency components of said detector output signal corresponding linearly and respectively to said frequency components of said light signal; and p1 de-emphasis circuit means responsive to said detector output signal for producing a de-emphasis output signal having frequency components corresponding respectively, linearly and with equal relative amplification to said frequency components of said input signal, said de-emphasizing of said detector output signal comprising relatively amplifying to a greater extent said frequency components of said detector output signal having frequency less than said first predetermined frequency and amplifying to a lesser extent said frequency components of said input signal having frequency greater than said first predetermined frequency.

20. The system of claim 19 wherein said transmitting subsystem further comprises amplifier means connected between said emphasis and said drive means for amplifying said emphasis output signal to generate an amplifier output signal for input into said drive means.

21. The system of claim 19 wherein said receiving subsystem further comprises preamplifier means connected between said detector and said de-emphasis means for preamplifying said detector output signal for input into said de-emphasis means.

22. The system of claim 19 wherein said receiving subsystem comprises amplifier means for amplifying said output of said de-emphasis means.

23. The system of claim 19 wherein said light transmitting means comprises a light emitting diode having a thermal time constant, said first predetermined frequency being larger than said thermal time constant.

24. A system for communicating, by means of light intensity modulation without a carrier, an input signal having multiple frequency components distributed over at least one frequency range, said system comprising transmission and receiving subsystems, at least one of said subsystems comprising at least one component having a varying range of linear operation that is a function of the frequency of said input signal, the narrower portions of said varying range of linear operation representing maximum operational limits for corresponding ones of said frequency components of said input signal, said system comprising:

emphasis means comprised within said transmission subsystem to relatively amplify to a lesser extent said frequency components of said input signal for which said range of linear operation of said at least one component represents said maximum operational limits; and de-emphasis means comprised within said receiving subsystems to relatively amplify to a greater extent said frequency components which were amplified to a lesser extent by said emphasis means.

* * * * *

UNITED STATES PATENT AND TRADEMARK OFFICE
CERTIFICATE OF CORRECTION

PATENT NO. : 4,207,459  Page 1 of 2
DATED : June 10, 1980
INVENTOR(S) : Hiroshi Nakamura; Naomasa Hanano; and Kazuo Iguchi It is certified that error appears in the above-identified patent and that said Letters Patent are hereby corrected as shown below:

First page, [75], line 3, "Chaigasaki" should be --Kanagawa--.

Column 2, line 46, after "$\tau$" insert --,--;

line 47, "f $\tau$ " should be --f $\tau$ --;

line 48, "f$\sqrt[4]{}$" should be --f $\tau$ --;

line 57, "approches" should be --approaches--;

line 64, after equation, at right margin, insert --(1)--;

line 65, delete "(1)".

Column 3, line 56, ";" should be --:--.

Column 4, line 21, "$l_1$" should be -- $\ell_1$ --;

line 27, "$l_2$" should be -- $\ell_2$ --.

Column 5, line 42, "$l_4$" should be -- $\ell_4$ --;

line 47, "$l_3$" should be -- $\ell_3$ --.

Column 6, line 26 "I" should be --We--.

Column 8, line 28, after "frequency", insert --,--.

UNITED STATES PATENT AND TRADEMARK OFFICE
CERTIFICATE OF CORRECTION

PATENT NO. : 4,207,459

DATED : June 10, 1980

INVENTOR(S) : Hiroshi Nakamura; Naomasa Hanano; and Kazuo Iguchi

It is certified that error appears in the above-identified patent and that said Letters Patent are hereby corrected as shown below:

Column 10, line 33, delete "pl"; and begin new paragraph with --transmitting means responsive to said drive--;

line 50, delete "pl"; and begin new paragraph with --de-emphasis--.

Signed and Sealed this

Eighteenth Day of November 1980

[SEAL]

Attest:

Attesting Officer

SIDNEY A. DIAMOND

Commissioner of Patents and Trademarks